United States Patent [19]

Marty et al.

[11] Patent Number: 5,725,010
[45] Date of Patent: Mar. 10, 1998

[54] PRESSURE BALANCED MIXING VALVE

[75] Inventors: Garry Marty, Fishers; Diana Smolkin, Indianapolis, both of Ind.

[73] Assignee: Masco Corporation of Indiana, Indianapolis, Ind.

[21] Appl. No.: 720,275

[22] Filed: Sep. 26, 1996

Related U.S. Application Data

[63] Continuation of Ser. No. 487,267, Jun. 7, 1995, abandoned, which is a continuation of Ser. No. 324,036, Oct. 14, 1994, abandoned, Ser. No. 68,846, May 27, 1993, abandoned, and Ser. No. 921,191, Jul. 28, 1992, abandoned.

[51] Int. Cl.$^6$ ........................... F16K 11/06
[52] U.S. Cl. ............ 137/100; 137/270; 137/454.6; 137/625.41; 137/854
[58] Field of Search ............ 137/98, 100, 270, 137/454.6, 625.41, 854

[56] References Cited

U.S. PATENT DOCUMENTS

| | | | |
|---|---|---|---|
| 3,674,048 | 7/1972 | Manoogian | 137/625.41 |
| 3,921,659 | 11/1975 | Rudewick | 137/98 |
| 4,095,610 | 6/1978 | Priesmeyer | 137/100 |
| 4,243,063 | 1/1981 | Parkison | 137/100 |
| 4,904,236 | 2/1990 | Redmond | 137/854 |
| 4,926,897 | 5/1990 | Perrott | 137/98 |
| 5,040,566 | 8/1991 | Orlandi | 137/625.41 |

*Primary Examiner*—Stephen M. Hepperle
*Attorney, Agent, or Firm*—Myron B. Kapustij; Malcolm J. Sutherland

[57] ABSTRACT

A mixing valve comprising a modular cartridge nonrotatably mounted in a housing. The cartridge includes inlet passages in its bottom portion, outlet passages in its top portion, and a pressure balance valve intermediate and in communication with said inlet and outlet passages. The inlet passages are in communication at their downstream ends with supply ports in the housing. The outlet passages are in communication at their upstream ends with a volume and temperature control valve plate. The volume and temperature control valve plate is rotatable to align or misalign outlet apertures in said plate with the outlet passages in the cartridge. The rotation of the plate is controlled by a stem attached to a handle. Means are provided to adjust the maximum water temperature. The temperature adjustment means include an orienting stem ring having an opening shaped to receive a complementary shaped section of the stem. The orienting stem ring has a splined shaped seat which receives an annular splined section of a hot water stop member. The hot water stop member also has a stop shoulder which, upon rotation, abuts against a stop flange of the housing cap.

17 Claims, 6 Drawing Sheets

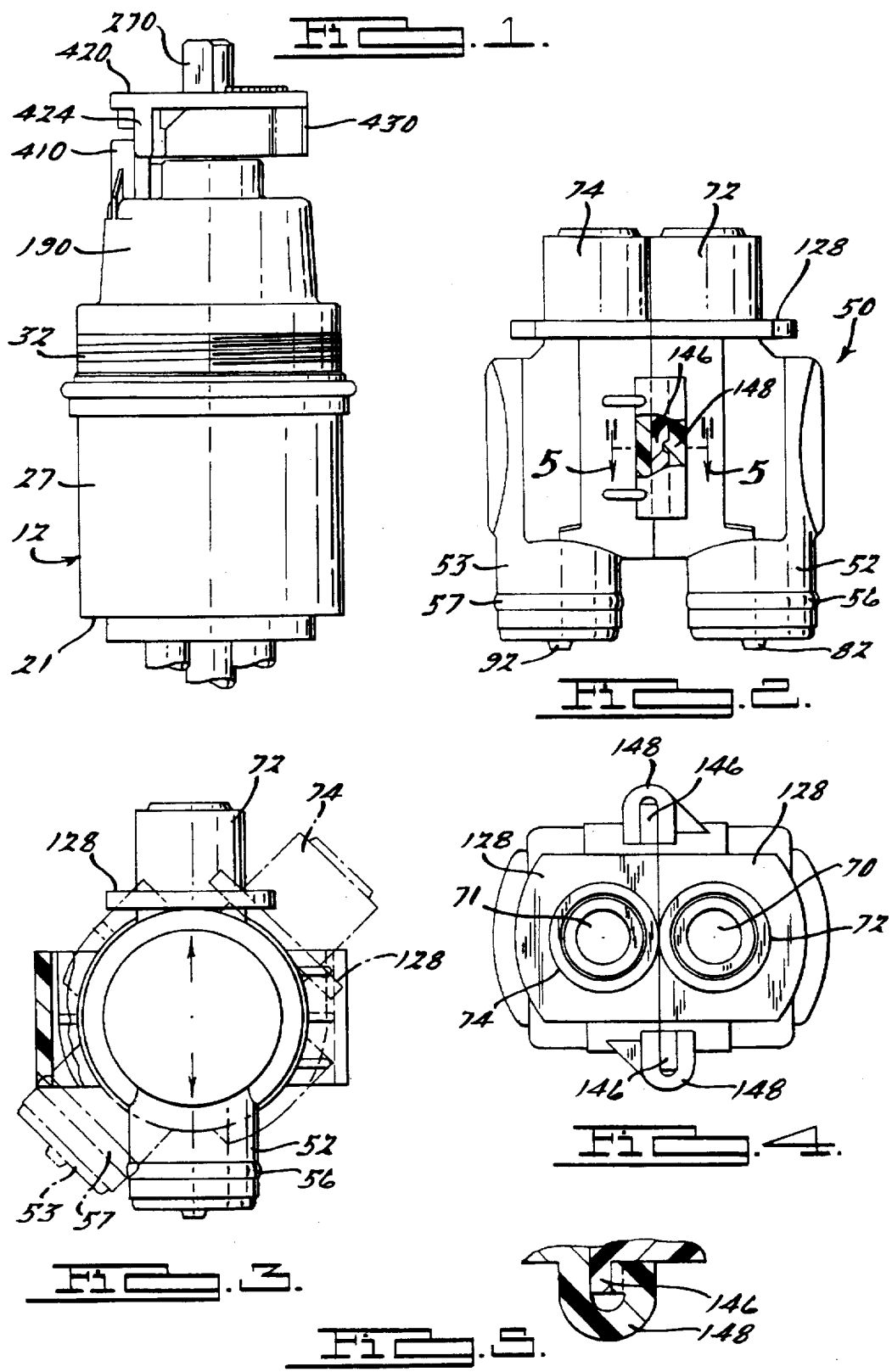

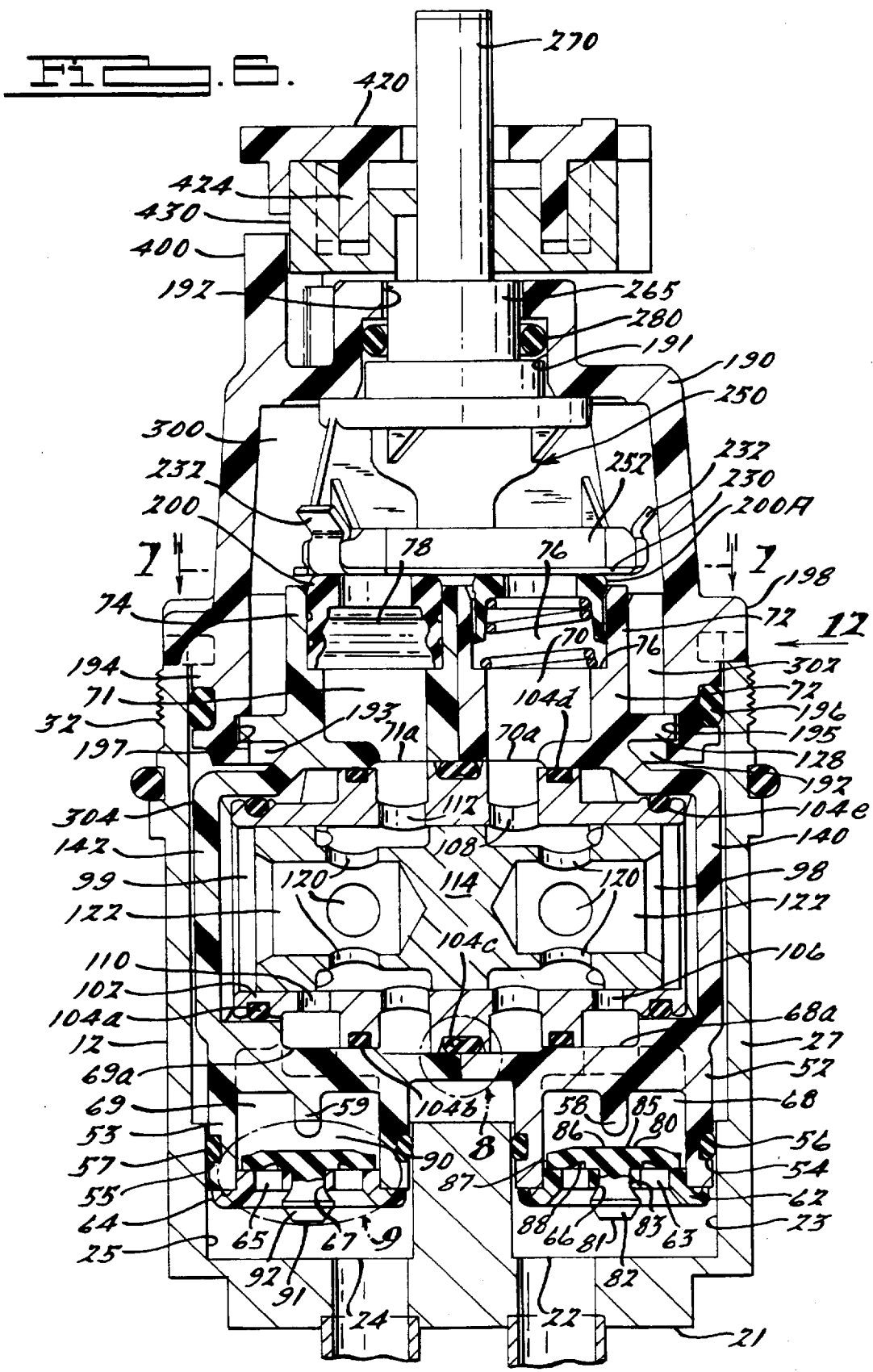

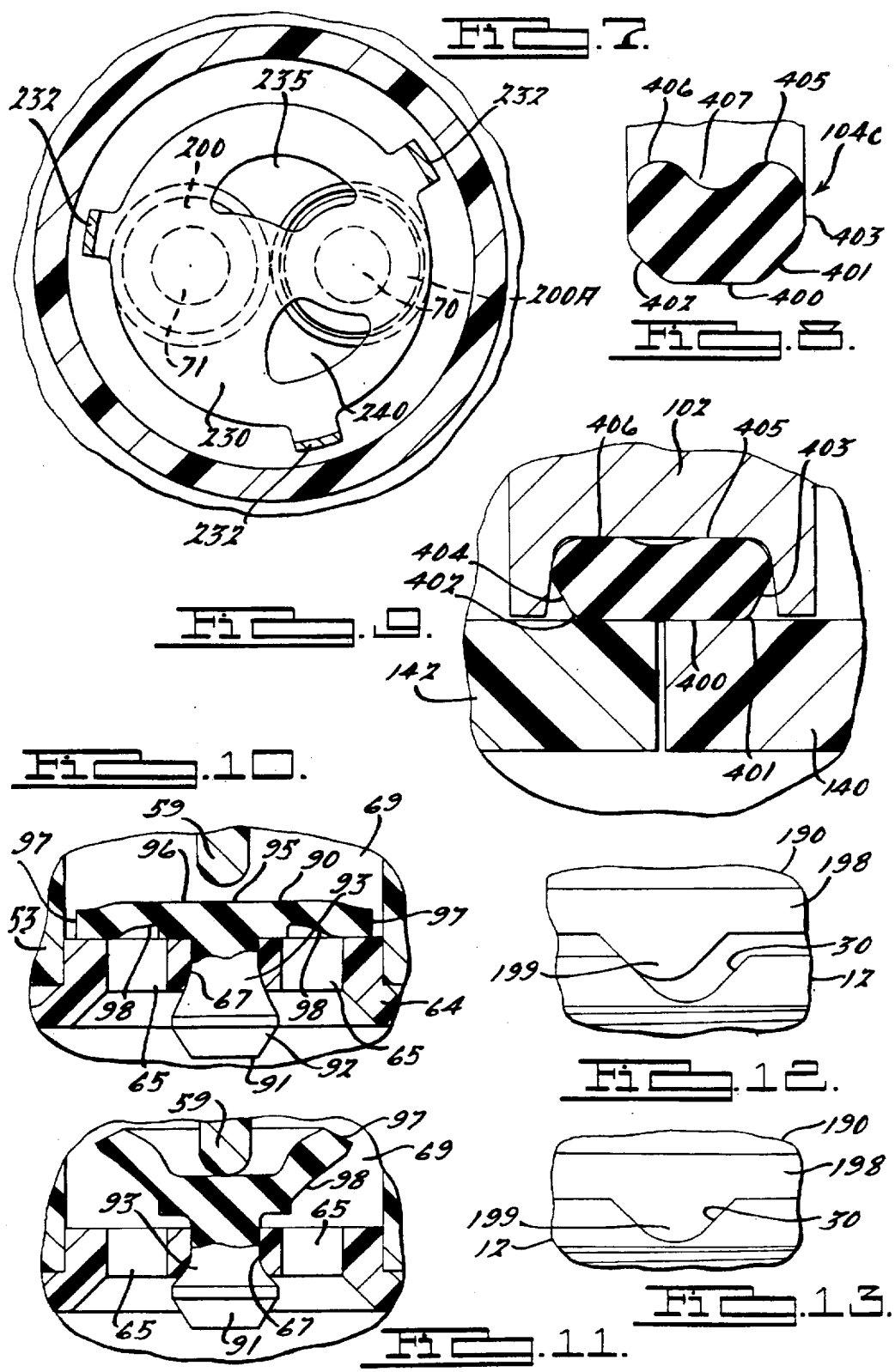

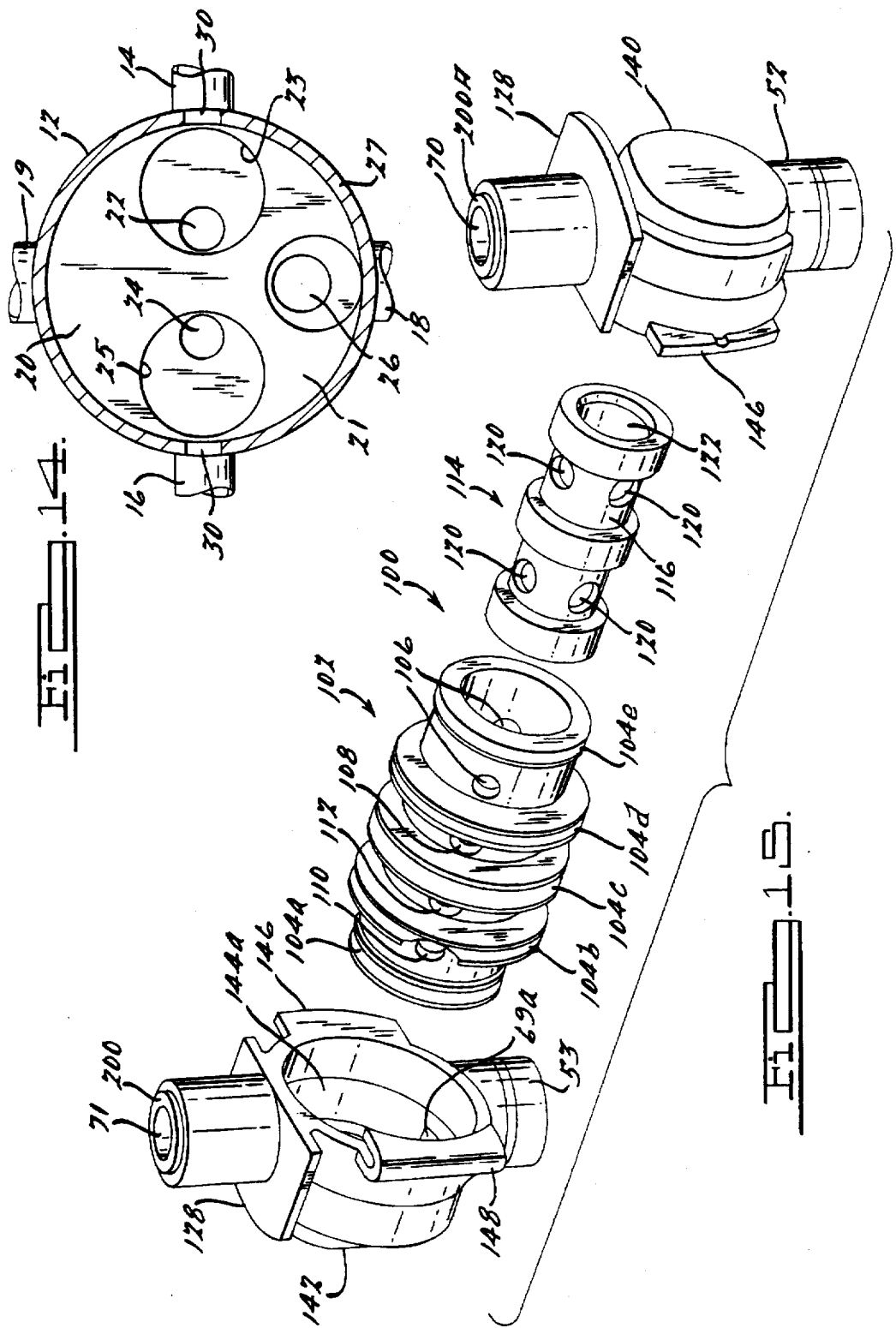

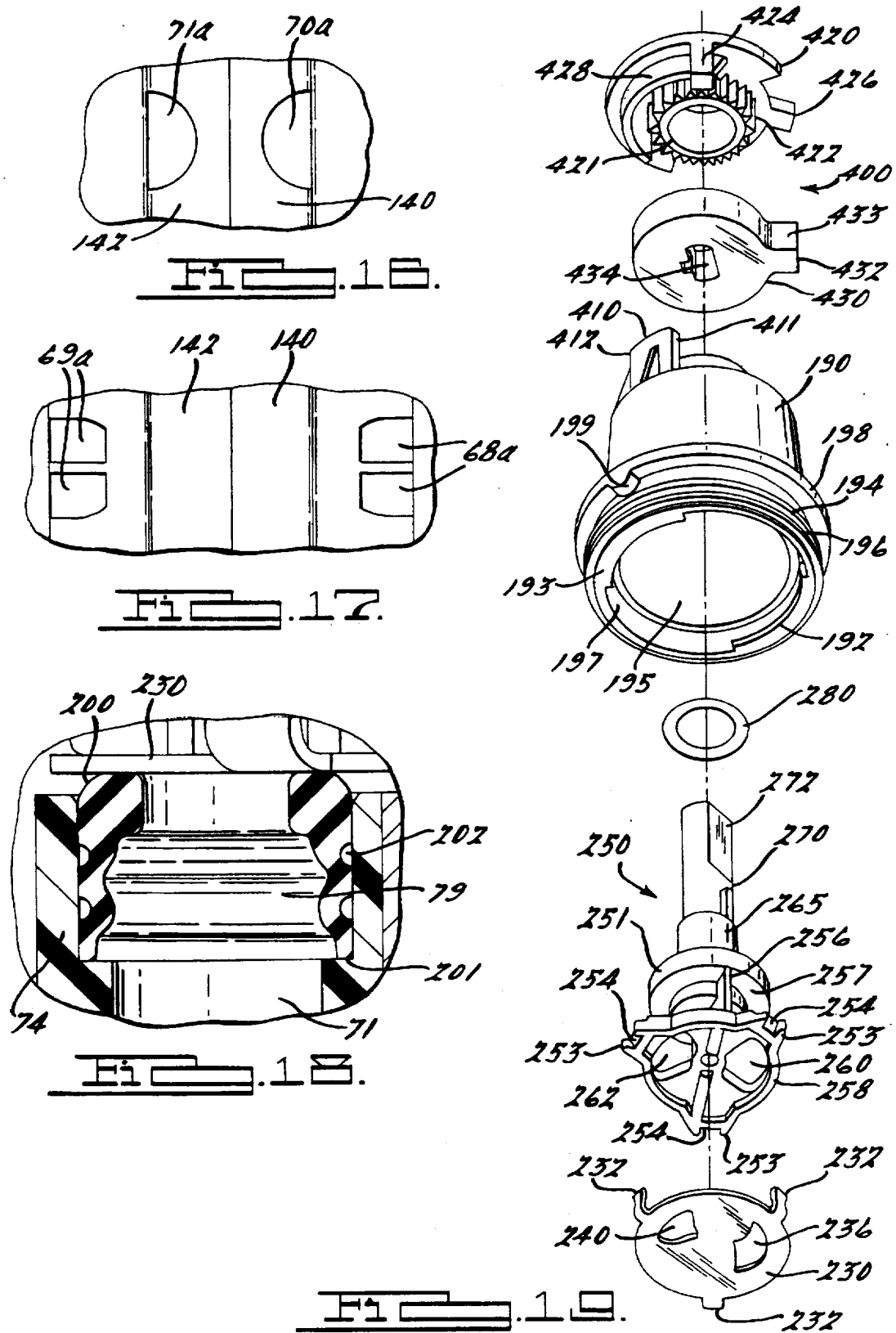

PRESSURE BALANCED MIXING VALVE

This application is a continuation of application(s) Ser. No. 08/487,267 filed Jun. 7, 1995; which is a continuation of Ser. No. 08/324,036 filed Oct. 14, 1994; Ser. No. 08/068,846 filed May 27, 1993; and Ser. No. 07/921,191 filed Jul. 28, 1992, all now abandoned.

FIELD OF THE INVENTION

The present invention relates to single handle mixing valves for tub spouts and shower heads, and more particularly to pressure balanced, volume and temperature controlled mixing valves.

BACKGROUND OF THE INVENTION

Single handle mixing valves have become commonplace in today's plumbing market. However, many compromises have been built into mixing valves such as the compromises between large flow rates and easy temperature control. Furthermore, mixing valves are often built without pressure balance valves. Previous mixing valves that have been designed with a built-in pressure balance mechanism are bulky and not adequately packaged in a compact housing. However, lack of a pressure balance valve can result in rapid change of water temperature when either the hot water supply or the cold water supply pressure drops. The pressure drop can occur if another faucet, dishwasher, or washing machine is turned on, or a toilet if flushed. When either the cold or hot water supply pressure changes, discomfort can result if a person is taking a shower.

Furthermore, previous pressure balance valves have been complicated mechanisms that cannot be easily repaired or have its parts replaced.

What is needed is an easily assembled cartridge type mixing valve assembly which pressure balances the hot and cold water supply and provides a full adjustment of the temperature in a compact mixing valve housing having easily adjusted temperature controls.

What is needed is a mixing valve that has its valve mechanisms housed in a cartridge that can be easily replaced when necessary.

SUMMARY OF THE INVENTION

In accordance with this invention the mixing valve for fluids includes a housing having a cavity with first and second supply ports and a discharge port in communication with the cavity. The cavity receives a cartridge that is non-rotatably mounted in the housing on a longitudinal axis. The cartridge includes first and second inlet passageways in communication at their upstream ends with said first and second supply ports, a chamber downstream of and in communication with said first and second inlet passageways, and first and second outlet passageways downstream of said chamber and in communication with said chamber. A spool type pressure balance valve is sealingly disposed in the chamber.

A generally planar valving surface is rotatably, slidably movable over the first and second outlet passageways for controlling the relative proportion of the fluid flow from the first and second outlet passageways into a third outlet passageway. The planar valving surface includes two apertures of different size and shape. These apertures can be misaligned, partially aligned, or totally aligned with said first and second outlet passageways to control the relative proportion of fluid flow from the first and second passageways.

An operating device, including a stem, rotates the planar valving surface relative to the cartridge for adjusting the relative proportion of fluid flow from the first and second outlet passageways into the third outlet passageway.

The third outlet passageway is in communication at its upstream end with said planar valving surface and at its downstream end with said discharge port. Preferably the third outlet passageway is defined by the exterior surfaces of the cartridge and the interior surfaces of a housing cap and the housing. The third outlet passageway also preferably includes a mixing chamber at its upstream end in the area adjacent the planar valving surface.

According to another aspect of the invention inner sealing means are interposed between the first and second outlet passageways and the planar valving surface. Outer sealing means are interposed between the first and second inlet passageways and the first and second supply ports to prevent fluid flow directly from the supply ports to the discharge port thereby preventing any fluid from bypassing the first and second inlet passageways so that all fluid must pass through the cartridge.

According to another aspects of the invention the valve is provided with temperature control means to adjust the maximum hot water temperature. The means comprise a stop flange on the housing cap, an orienting stem ring non-rotatably mounted on the portion of the stem extending exteriorly of the housing cap, and a hot water stop member which can be received in the orienting stem ring in a number of rotated positions. The hot water stop member includes a stop shoulder which is circumferentially spaced from said stop flange and is adapted, upon rotation of the stop member, to abut against said stop flange. The greater the arc through which said stop shoulder travels before it abuts against the stop flange the higher the maximum hot water temperature. Conversely, the shorter the arc through which said stop shoulder travels before it abuts against the stop flange the lower the maximum water temperature.

BRIEF DESCRIPTION OF THE DRAWINGS

FIG. 1 is a side elevational view of a mixing valve assembly according to the invention showing the housing cap inserted into the housing;

FIG. 2 is a front elevational view of the cartridge assembly;

FIG. 3 is a side elevational view of the cartridge assembly showing one half of the assembly rotated relative to the other half of the assembly;

FIG. 4 is a top plan view of the cartridge assembly;

FIG. 5 is an enlarged fragmentary view taken along line 5—5 in FIG. 2 showing the engaged bayonet coupling;

FIG. 6 is an elevational, segmented view of the valve assembly shown in FIG. 1;

FIG. 7 is a cross-sectional view taken along line 7—7 in FIG. 2 with the volume-temperature control plate out of register with the outlets, i.e., the valve in the off or closed position;

FIG. 8 is an enlarged view of the central sealing ring within line 8 in FIG. 6, said sealing ring being in the uncompressed state;

FIG. 9 is a view of the central sealing ring of FIG. 8 in a compressed state;

FIG. 10 is an enlarged view of the check valve within line 9 in FIG. 7, said check valve being in the closed position;

FIG. 11 is a view of the check valve of FIG. 10 in an open position;

FIG. 12 is an enlarged side elevational view of the key of the housing cap immediately prior to its engagement with the slot in the housing;

FIG. 13 is an enlarged side elevational view of the key of the housing cap in engagement with the slot in the housing;

FIG. 14 is a top plan view of the housing showing the hot and cold water supply ports and the discharge port;

FIG. 15 is an exploded perspective view of the cartridge assembly and the spool type pressure balance proportioning valve;

FIG. 16 is a fragmentary bottom plan view of the interior of the cartridge assembly showing the outlet ports through which the cavity in the cartridge assembly is in communication with the outlet passageways;

FIG. 17 is a fragmentary top plan view of the interior of the cartridge assembly showing the inlet ports through which the cavity in the cartridge assembly is in communication with the inlet passageways;

FIG. 18 is an enlarged fragmentary sectional view showing the seal element of FIG. 6;

FIG. 19 is a bottom perspective view showing the valve plate, stem assembly, housing cap, and the temperature control knob assembly;

DESCRIPTION OF THE PREFERRED EMBODIMENT

Figure 20:
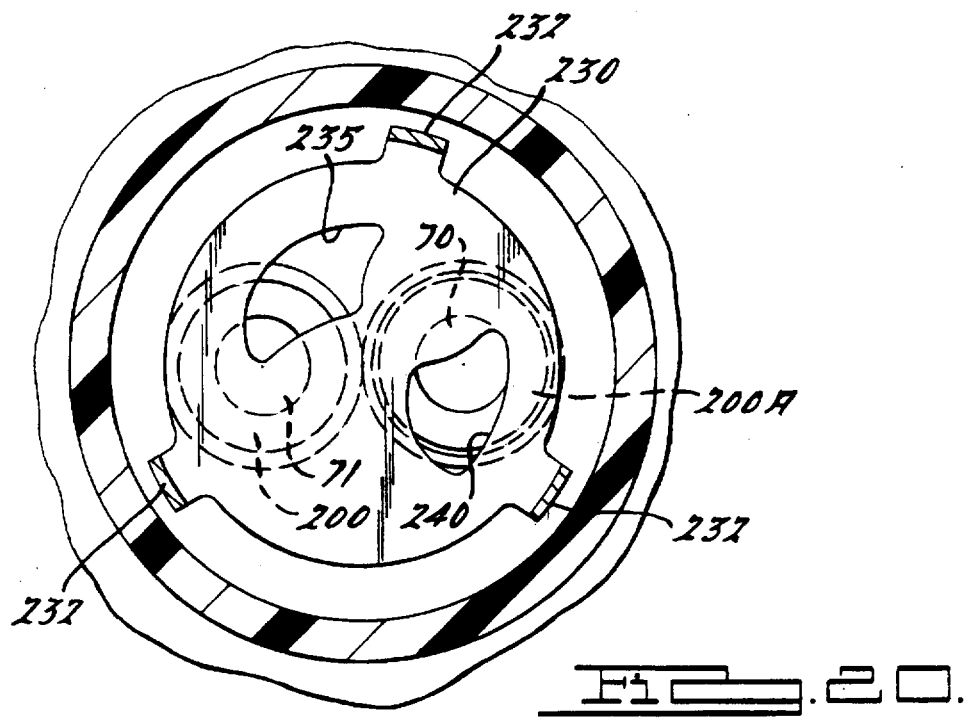
FIG. 20 is a view similar to FIG. 7 with the volume-temperature control plate rotated to a partial on position.
Figure 21:
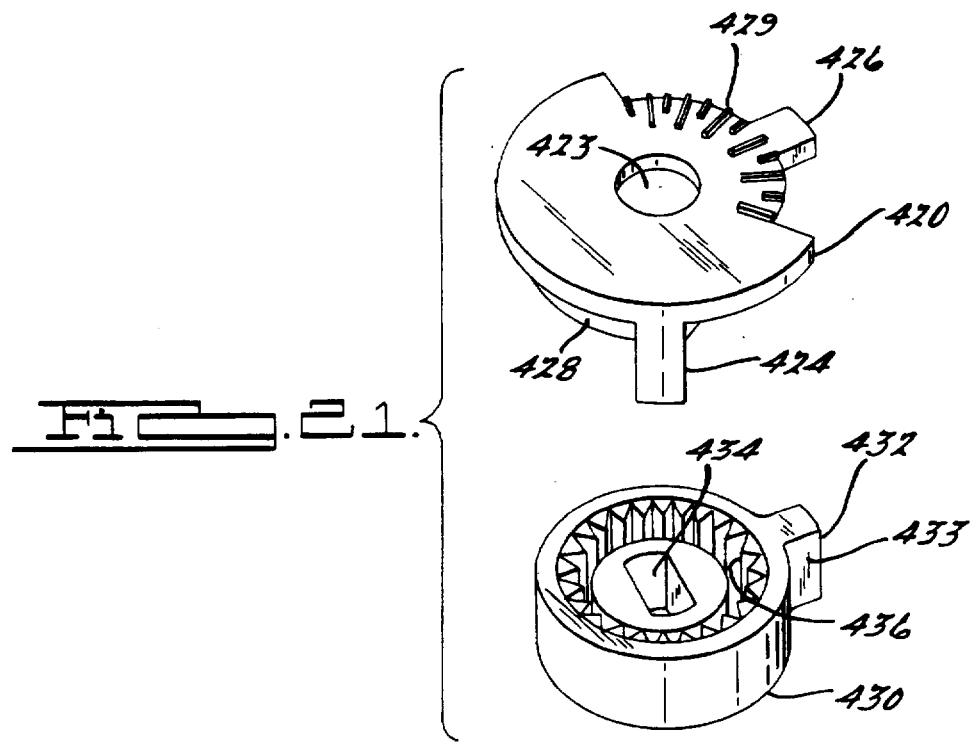
FIG. 21 is a top perspective view of the temperature control knob assembly.

Mixing valve 10 has a housing 12 connected to a fitting which is usually mounted behind a shower wall (not shown). The fitting has a cold water supply pipe (not shown) and a hot water supply pipe (not shown), and outlet pipe leading to a tub spout (not shown) or outlet pipe connected to a shower riser (not shown).

As best illustrated in FIGS. 6 and 14, housing 12 has a cavity 20, defined by an end axially positioned or bottom wall 21 and side wall 27, with cold water supply port 22 in communication with a cold water source through cold water supply pipe, and supply port 24 in communication with a hot water source through hot water supply pipe. The supply ports 22 and 24 pass through bottom wall 21 at the bottom of cavity 20. The supply ports 22 and 24 include counterbores 23 and 25, respectively. A discharge port 26 also extends through the bottom wall 21 and is in communication with the two outlet pipes. The housing contains external threads 32 adjacent its top adapted to threadably receive a collar (not shown).

A cartridge assembly 50 is non-rotatably disposed in cavity 20. As best shown in FIGS. 2, 6 and 15, cartridge assembly 50 contains two laterally spaced apart downwardly or axially projecting hollow tubular extensions 52 and 53 at its bottom. Tubular extension 52 has an annular groove 54 in its exterior wall surface adjacent its bottom which receives sealing ring 56. Tubular extension 53 also has an annular groove 55 in its exterior wall surface adjacent its bottom which receives sealing ring 57. As best illustrated in FIG. 6 tubular extension 52 is fitted into counterbore 23 while tubular extension 53 is fitted into counterbore 25. Sealing ring 56 forms a seal with the side wall of counterbore 23 to prevent water from supply port 22 entering cavity 20 and reaching discharge port 26, while sealing ring 57 forms a seal with the side wall of counterbore 25 to prevent water from supply port 24 entering cavity 20 and reaching discharge port 26. The sealing rings 56 and 57 effectively prevent water from bypassing cartridge assembly 50.

Tubular extension 52 includes bottom wall 62 having a plurality of radially outer apertures 63 and a central mounting aperture 66. The central mounting aperture 66 receives a stem 81 of check valve 80. Check valve 80 covers the apertures 63 to control water flow through apertures 63 into inlet passageway 68 as described infra. Tubular extension 53 includes bottom wall 64 having a plurality of radially outer apertures 65 and a central mounting aperture 67. The central mounting aperture 67 receives a stem 91 of check valve 90. Check valve 90 covers aperture 65 to allow water flow through apertures 65 into inlet passageway 69 as described infra.

As illustrated in FIG. 6 valves 90 and 80 are identical. Therefore, the structure and operation of only check valve 90 will be described, it being understood that the structure and operation of check valve 80 is the same as that of check valve 90. As illustrated in FIGS. 10 and 11 check valve 90 includes a stem 91 and a body portion 95. The stem 91 is comprised of a bulbous tip 92 and a neck 93 connecting the tip 92 to the body portion 95. The neck is generally circular in cross section and is sized to fit within circular central mounting aperture 67. The bulbous tip 92 is larger than aperture 67 to prevent check valve 90 from being dislodged from central mounting aperture 67 and into inlet passageway 69. The body portion 95 is disc shaped and includes a central section 96 and a radially outer section 97. Intermediate the central section 96 and radially outer section 97 is an annular section 98 of reduced thickness.

The check valves 80 and 90 function to prevent cross-flow of hot water from the hot water supply pipe into the cold water supply pipe and vice versa. This cross-flow can occur if there is a pressure differential between the hot and cold water supply pipes. For example, in the absence of the check valves if there is no pressure or a low pressure in the hot water supply pipe and the valve is in the closed or off position (apertures 235 and 240 in plate 230 are out of register with outlet passageways 71 and 70) cold water would flow into pressure balance valve 100 through inlet passageway 68 and exit from the pressure balance valve via inlet passageway 69, the cold water would then flow through inlet passageway 69 and enter the hot water supply pipe through hot water supply port 24. The check valves prevent hot and/or cold water from flowing out of the cartridge assembly 50 into hot or cold water supply lines through inlet ports 22 or 24.

The thick radially outer section 97 of the body portion 95 of check valve 90 reduces or minimizes high pressure failures of the check valve. Such high pressure failures can occur when water pressure in the cartridge assembly 50 is relatively high, thereby forcing the check valve 90 into a closed position as illustrated in FIG. 10. If the radially outer section 97 was thin, it could be forced into apertures 65. However, since section 97 is thick this type of failure is greatly reduced or eliminated.

The relatively thin annular section 98 allows the relatively thick section 97 to bend upward to the open position of the check valve (as illustrated in FIG. 11) easily. If this annular section 98 was too thick, it would require a rather high water pressure in the hot and cold water supply pipes to force the radially outer section upward to open the check valve and allow ingress of water into the cartridge assembly 52.

When the valve is in the open position, i.e., the apertures 235 and 240 in plate 230 are in partial or full alignment with outlet passageways 71 and/or 70, the pressure in the cartridge assembly 50, i.e., downstream or above check valve 90, is less than the water pressure upstream or below check valve 90. The greater water pressure below check valve 90 forces the radially outer sections 97 upwardly as shown in FIG. 11, thereby opening check valve 90. Check valves 80 and 90 are preferably comprised of an elastomeric material such as rubber.

Downwardly extending pins 58 and 59 are disposed in inlet passageways 68 and 69, respectively. The pin 59, as best illustrated in FIG. 11, impinges upon the central section 96 of the body 95 of the check valve 90 when it is in the open position. Pin 59 provides an added safeguard against the check valve 90 popping out of the central mounting aperture 67.

Tubular extension 52 has an inlet passageway 68 leading from apertures 63 to a first section 98 of a spool type pressure balance proportioning valve 100 through inlet port 68a. Tubular extension 53 also has an inlet passageway 69 leading from apertures 65 to a second section 99 of spool type valve 100 through inlet port 69a. The proportioning valve 100 is disposed in chamber 144 in the cartridge assembly.

As best illustrated in FIG. 15 the spool type pressure balance proportioning valve 100 has an outer spool 102 with five sealing rings 104a, 104b, 104c, 104d and 104e about its outer circumference to separate inlet passageway 68, inlet passageway 69, outlet passageway 70, and outlet passageway 71. The outer spool 102 also has axially spaced apertures 106, 108, 110 and 112 aligned with respective passageways 68, 70, 69 and 71. A piston 114 is slidably mounted within outer spool 102. The piston has two annular grooves 116 and 118. Grooves 116 and 118 selectively communicate the passageway 68 to 70 and 69 to 71 depending on the axial position of the piston. Piston 114 also has apertures 120 therethrough which communicate the grooves 116 and 118 to the internal sections 122 to allow fluid flow from each of inlet passageway 68 and 69 to exert pressure against the full cross sectional area of each end of piston 114. In this way the pressure within each outlet passageway 70 and 71 is substantially equalized in the movement of piston 114 of the spool valve 100.

As best illustrated in FIG. 8 seal 104c, in its uncompressed state, has a cross-sectional configuration comprised of a top flat wall 400 which is in contact with the two halves 140 and 142 of cartridge assembly 50 as shown in FIG. 9. Two vertically extending side walls 403 and 404 are disposed on either side of flat surface 400. The bottom portions 401 and 402 of the side walls 403 and 404 are bevelled inwardly to meet the top flat wall 400. The bottom wall is comprised of two outer convex ridges 405 and 406 with a concave depression 407 therebetween.

When the cartridge assembly is pressurized, i.e. when water flows into chamber 144, the two halves 140 and 142 of the cartridge assembly are forced apart by water pressure leaving a slight gap therebetween as shown in FIG. 9. When seal 104c is in a compressed state it flattens out and thereby adequately seals off this gap.

The cartridge assembly 50 is comprised of two halves 140 and 142, each having a cavity 144a and 144b which together form chamber 144 sized to receive the proportioning valve 100. Halves 140 and 142 are preferably comprised of a plastic material such as acetal, nylon, etc. The inlet passageways 68 and 69 are in communication with said chamber 144 through inlet ports 68a and 69a. Outlet passageways 70 and 71 are in communication with chamber 144 through outlet ports 70a and 71a. Each half 140 and 142 of the cartridge has a vertically or axially extending flange 146 and a U-shaped clip 148 adapted to receive said flange 146, as shown in FIG. 15, which together form two bayonet couplings to secure the two halves together.

The two cartridge halves 140 and 142 are assembled, as shown in FIG. 3, by rotating the half 140 or the half 142 so that the flange 146 of cartridge half 140 is inserted into clip 148 of cartridge half 142 and the flange 146 of cartridge half 142 is inserted into clip 148 of cartridge half 140.

Each half 140 and 142 also contains an axial, upwardly extending tubular extension 72 and 74, respectively, at its top. The inner wall of tubular extension 72 defines outlet passageway 70, and the inner wall of tubular extension 74 defines outlet passageway 71. Outlet passageway 70 is in communication with chamber 144 via outlet port 70a while outlet passageway 71 is in communication with chamber 144 via outlet port 71a. Tubular extension 72 has a bore 76 of enlarged inner diameter in its inner wall at the upstream end thereof. Tubular extension 74 likewise has a bore 78 of enlarged inner diameter in its inner wall at the upstream end thereof. Bore 76 is in communication with outlet passageway 70 and bore 78 is in communication with outlet passageway 71. Bores 76 and 78 receive seal elements 200 or spring and seal assemblies 200a. Spring and seal assembly 200a is of a well known and conventional type while seal element 200 is of an improved construction.

As best illustrated in FIG. 18 seal 200 is a face seal which seals at the bottom section 201 thereof. The side wall 202 of seal 100 is accordion shaped. This shape of the side wall 200 allows the seal 200 to buckle or compress like an accordion. The seal 200 thus adjusts to the width and depth of the counterbore 79 and need not be sized exactly to fit within counterbore 79. Furthermore, since seal 200 seals at bottom 201 the side wall of the counterbore need not be smooth and free of imperfections as is the case if a lip seal, such as seal 200A, is used. Seals 200 and 200A are made of an elastomeric material such as rubber.

The cartridge assembly 50, which is preferably made of plastic, is secured to the housing cap 190, which is also preferably made of plastic, with a bayonet lock structure. The housing cap includes an annular lower wall portion 197 that has a larger inner diameter than the inner diameter of the inner wall section 195 above said annular lower wall portion 197. A pair of opposed bayonet latch ledges 192, 193 extend radially inwardly from the bottom of said annular lower wall portion 197. The cartridge assembly 50 includes a rectangular shaped bayonet projection 128. To attach the cartridge assembly 50 to the cap housing 190, the cartridge assembly is inserted within the annular lower wall portion 197 with the bayonet projection 128 displaced from the ledges 192, 193. The cartridge assembly is then rotated to the interlocked position shown in FIG. 6 whereby the bottom of bayonet projection 128 abuts against the top of latch ledges 192, 193.

A volume and temperature control valve plate 230, made from stainless steel, is affixed against rotation to stem assembly 250 which is rotated by a handle as described later. The handle as it rotates also rotates the stem assembly 250 about its longitudinal axis such that the volume and temperature control plate 230 also rotates about said longitudinal axis so that apertures 235 and 240 can become aligned with outlet passageways 71 and 70 at the on position, as shown in FIG. 20, or can be closed to a full off position with the apertures 235 and 240 out of register with passageways 71 and 70.

As shown in FIG. 19 stem assembly 250 includes a stem receiver 251, preferably made of a plastic material, with a bottom wall 252 containing three lateral flanges 253 having notches 254 therein. Notches 254 receive corresponding tabs 232 on the volume and temperature control valve plate 230 to affix the volume control plate to the stem receiver 251. The stem receiver has an undercut 257 above the bottom wall 252. A supporting rib 256 extends within the undercut 257. More than one rib 256 may be employed. The stem receiver 251 has a top portion 265 which receives stem 270. Stem 270 is affixed against rotation to stem receiver 251.

The bottom surface of bottom wall 252 of stem receiver 251 is recessed, forming a ridge around its perimeter. This ridge 258 is the portion of bottom wall 252 that is in contact with volume and temperature control valve plate 230. Bottom wall 252 also contains two apertures 260 and 262. Apertures 260 and 262 are in axial alignment with apertures 235 and 240 in volume and temperature control valve plate 230.

As shown in FIGS. 6 and 19 the stem receiver assembly 250 rotatably fits within the housing cap 190, with the top portion 265 thereof fitting within the reduced diameter portion 191 of housing cap 190 and extending into aperture 192 in the top of housing cap 190. The stem 270 thus extends exteriorly of housing cap 190 through aperture 192. As illustrated in FIG. 6 a sealing O-ring 280 is disposed between the interior surface of the reduced diameter portion 191 of housing cap 190 and the top portion 265 of the receiver assembly 250.

The housing cap 190 has a lower portion 194 which seats an O-ring 196. Cap 190 also has an annular flange 198 above lower portion 194. Flange 198 has at least one axially extending key 199 that fits within slot 30 at the open distal end of the housing 12 as shown in FIGS. 12 and 13. The key 199 is of a convex, rounded shape while the slot 30 is of a complementary concave shape. This arrangement allows for ease of assembly and disassembly of the cartridge assembly by allowing the housing cap to cam in or cam out of the housing.

As illustrated in FIG. 6 the lower portion 194 of housing cap 190 fits within the housing 12. The seal 196 is disposed between the outer surface of lower portion 194 and the inner surface of wall 27 of housing 12 to prevent leakage between housing cap 190 and housing 12. The bottom of the annular flange abuts against the top of wall 27 of housing 12.

The housing 12 has a threaded section 32 which threadably secures a collar. The collar has an inner flange which abuts against the top of flange 192 of cap 190 to secure cap 190 to housing 12.

The maximum water temperature can be easily adjusted by adjustment of the temperature control assembly 400 which includes an orienting stem ring 430. Stem ring 430 has a central opening 434 shaped to snugly receive a complementary shaped section 272 of stem 270. The top of orienting stem ring 430 has an annular seat 432 with a splined section 436 thereabout. A disc shaped hot water stop member 420 has a complementary shaped annular, axially downwardly extending splined section 422, with the splines extending radially inwardly from an annular central section 421, which can adjustably be positioned and secured in the seat 432 to the splined section 436 about a number of rotated positions.

The stem ring 430 has a stop shoulder 432 which has side 433 which abuts against side 411 of stop flange 410 on the top of housing cap 50 when the valve is in the off position. The hot water stop member 420 has a central opening 423 through which section 272 of stem 270 protrudes. Stop member 420 also has a stop shoulder 424 which is adapted to abut against side 412 of stop flange 410, and a radially outer arcuate rib 428 which is adapted to abut against stop shoulder 432.

OPERATION OF THE VALVE

The cartridge assembly 50 is in the off position when the volume and temperature control plate 230 is rotated so that its apertures 235 and 240 are totally misaligned with outlet passageways 71 and 70, as illustrated in FIG. 7, such that the seal elements 200 or 200a abut against the bottom surface of plate 230 and no water flows past seal elements 200 or 200a. When in the off position side 433 of stop shoulder 432 of stem ring 430 abuts against side 411 of stop flange 410 on the top of housing cap 50. The valve can be opened by rotating stem 270, via a handle (not shown), in a counterclockwise direction to any position until stop shoulder 424 of stop member 420 abuts against side 412 of stop flange 410. Such counterclockwise rotation of the stem 270 also causes counterclockwise rotation of stem assembly 250 and plate 230. Counterclockwise rotation of plate 230 brings apertures 235 and 240 into partial, and later into full, alignment with outlet passageways 71 and 70 as illustrated in FIG. 20. The plate 230 functions to control both the volume and temperature of the water.

As seen in FIGS. 7 and 20 apertures 235 and 240 are of different size and shape. Aperture 235 controls the flow of hot water while aperture 240 controls the flow of cold water. Thus when aperture 235 is in register with outlet passageway 71 hot water flows past plate 230 into mixing chamber 300. When aperture 240 is in register with outlet passageway 70 cold water flows through aperture 240 past plate 230 into mixing chamber 300. Due to the particular configuration of apertures 235 and 240 counterclockwise rotation of plate 230 brings aperture 240 into partial register with cold water outlet passageway 70 while aperture 235 is still misaligned with hot water outlet passageway 71. Thus, flow of cold water will commence first followed, upon further counterclockwise rotation of plate 230, by the flow of hot water into mixing chamber 300. Since initially only aperture 240 of plate 230 is in partial register with cold water outlet passageway 70, further counterclockwise rotation of plate 230 will move aperture 235 into partial register with hot water outlet passageway 71, thereby adjusting the temperature of the water from cold to warm and simultaneously increasing the volume flow of water. Further counterclockwise rotation of plate 230 results, due to the particular configuration of apertures 235 and 240, in aperture 240 having a lesser degree of registration with cold water outlet passageway 70 than aperture 235 has with hot water outlet passageway 71 thereby adjusting the temperature of the water from warm to hot. Such a situation is illustrated in FIG. 20.

Once the valve is open the water pressure in inlet passageways 68 and 69 is less than the water pressure in counterbores 23 and 25. This pressure differential forces check valves 80 and 90 open, as shown in FIG. 11, thereby allowing water to flow into inlet passageways 68 and 69 through apertures 63 and 65. Cold and hot water, respectively, flow from inlet passageways 68 and 69 through inlet ports 68a and 69a to the appropriate apertures 106 and 110 in spool 102 in chamber 144. The water pressure within the two supply lines acts upon the piston 114 to even the flow rate of the hot and cold water passing to outlet ports 70a and 71a via apertures 108 and 112 in spool 102. The water then flows through outlet passageways 70 and 71 to bores 78 and 79. Flow out of bores 78 and 79 and outlet passageways 70 and 71 into mixing chamber 300 is controlled by the position of the apertures 240 and 235 in valve plate 230.

Water is then mixed within the mixing chamber 300 and passes through annular outlet passage 302 formed by the outer surface of cartridge assembly 50 and the inner wall surface of the housing cap 190 into annular outlet passage 304 formed by the outer side surface of cartridge assembly 50 and the inner surface of side wall 27 of housing 12, and from annular passage 304 to the discharge port 26 at the bottom wall 21 of housing 12.

The maximum water temperature can be easily adjusted by removing the hot water stop member 420 from the seat 432 of stem ring 430, rotating and reinserting the member 420 in the seat 432. The position of hot water stop member 420 in the seat 432 determines the maximum hot water temperature. Thus, if the hot water stop member 420 is rotated clockwise relative to the stem ring, with a consequent increase in the circumferential spacing or arc between the stop shoulder 424 of hot water stop member 420 and the stop flange 410, the maximum water temperature is increased since stem ring member 430 and stem 270 can be rotated more degrees counterclockwise. If the hot stop member 420 is rotated counterclockwise relative to the stem ring 430, with a consequent decrease in the circumferential spacing or arc between the stop shoulder 424 and the stop flange 410, the maximum water temperature is lowered since the stem ring member can not be rotated as many degrees counterclockwise. The more degrees that stem ring 430 can be rotated counterclockwise, the more fully hot water aperture 235 of valve plate 230 is in register with hot water outlet passageway 71, and the hotter the water temperature.

The arcuate rib 428 of stop member 420 in conjunction with the stop shoulder 432 of the orienting stem ring 430 functions to limit the maximum hot water temperature. Stop shoulder 432 and arcuate rib 428 serve to limit the maximum clockwise rotational position of stop member 420 in orienting stem ring 430 and, therefore, limit the arc that stop shoulder 424 is spaced from stop flange 410. This, in turn, limits the arc through which stop shoulder 424 and, therefore, the stop member 420 can be rotated in a counterclockwise direction before stop shoulder 424 abuts against stop flange 410.

What is claimed is:

1. A mixing valve comprising:
   a housing having a side wall and a bottom wall defining a cavity, said bottom wall having first and second supply ports and an outlet port;
   a housing cap removably mounted on said housing;
   a valve plate having a first outlet aperture and a second outlet aperture rotatably mounted in said housing cap;
   a cartridge non-rotatably disposed in said cavity intermediate said bottom wall and said valve plate;
   said cartridge having a second chamber therein, first inlet passageway upstream of said chamber in communication at its downstream end with said chamber and at its upstream end with said first supply port, second inlet passageway upstream of said chamber in communication at its downstream end with said chamber and at its upstream end with said second supply port, first outlet passageway downstream of said chamber in communication at its upstream end with said chamber and at its downstream end with said valve plate, and second outlet passageway downstream of said chamber in communication at its upstream end with said chamber and at its downstream end with said valve plate;
   third outlet passageway intermediate said valve plate and said outlet port in communication at its upstream end with said valve plate and at its downstream end with said outlet port;
   means to rotate said valve plate to align and misalign said first outlet aperture with said first outlet passageway and said second outlet aperture with said second outlet passageway to thereby open and close communication between said first and second outlet passageways and said third outlet passageway to vary at least the amount of fluid passing into said third outlet passageway;
   means for adjusting the maximum temperature of the fluid exiting from said outlet port including
      an axially extending stop flange on the exterior of said housing cap adjacent its top;
      an orienting stem ring having an opening having a rotational asymmetric shape to receive a complementary shaped stem at only one rotated orientation, and an annular shaped seat cavity; and
      a disc shaped stop member having a central opening to receive said stem, an axially protruding annular section complementary to said annular shaped seat cavity so that said stop member can be received in said seat cavity in a plurality of rotated positions, and a stop shoulder adapted to engage said stop flange to prevent further rotational movement of said stop member; and
   means within said chamber to even the pressures of the fluids from said first and second supply ports that are delivered to said outlet port.

2. The mixing valve of claim 1 wherein said means to even pressure comprises a spool valve disposed in said chamber.

3. The mixing valve of claim 2 wherein said spool valve comprises an inner spool piston slidably mounted in an outer spool, said outer spool sealingly disposed in said chamber.

4. The mixing valve of claim 2 wherein said first and second inlet passageways communicate fluid from said first and second supply ports into said chamber, and said spool valve comprises a central land spaced between said first and second inlet passageways preventing flow from said passageways from intermixing within said chamber, flow from said first and second inlet passageways being directed against said spool valve such that separate throttle lands associated with each of said first and second inlet passageways are urged by pressure from the respective inlet passageway to throttle the flow from that inlet passageway into said chamber.

5. The mixing valve of claim 4 wherein said throttle lands are positioned at locations spaced away from said central land and communication bores are formed through each of said throttle lands, such that fluid from said first and second inlet passageways passes into said chamber at a location between said central land and a respective one of said throttle lands, and passes through said respective throttle land such that the fluid pressure from each said inlet passageway acts against said spool valve in a direction toward the other of said inlet passageways.

6. The mixing valve of claim 2 wherein said first and said second inlet passageways contain check valves intermediate their upstream and downstream ends.

7. The mixing valve of claim 6 wherein said check valves include a disk shaped body section, said body section having a radially outer portion, a central portion, and an annular portion of reduced thickness intermediate said central portion and said radially outer portion.

8. The mixing valve of claim 2 wherein said cartridge has two generally symmetric shell portions which are secured together to define said chamber.

9. The mixing valve of claim 2 wherein seal means are disposed in the first and second outlet passageways at their downstream ends, said seal means forming a seal between said downstream ends of said first and second outlet passageways and the valve plate to prevent the passage of fluid into said third outlet passageway when said outlet apertures in said valve plate are misaligned with said first and second outlet passageways.

10. The mixing valve of claim 9 wherein said seal means comprise face seals.

11. The mixing valve of claim 10 wherein said face seal includes a side wall having an accordion-like shape, which side wall may be compressed to diminish the height of said face seal.

12. The mixing valve of claim 2 wherein said means to rotate said valve plate comprise a stem receiver having a bottom portion and a top portion, said bottom portion having rigidly affixed thereto said valve plate and said top portion having rigidly secured therein a stem.

13. The mixing valve of claim 12 wherein a portion of said stem extends exteriorly of housing cap and has a handle affixed to said portion extending exteriorly of said housing cap.

14. The mixing valve of claim 2 wherein said third outlet passageway is defined by the exterior surface of said cartridge and the interior surface of said housing cap and the interior surface of said side wall of said housing.

15. The mixing valve of claim 2 wherein said first outlet aperture and said second outlet aperture are of different shapes.

16. The mixing valve of claim 15 wherein said first outlet aperture and said second outlet aperture have different areas.

17. The mixing valve of claim 1 wherein said annular cavity of said orienting stem ring contains a plurality of radially inwardly directed splines along its radially outer periphery which engage a plurality of complementary radially outwardly directed splines on said axially protruding annular section of said stop member.

* * * * *